Aug. 28, 1945.  W. L. MORGAN  2,383,470
METHOD OF AND APPARATUS FOR CLEANING AND
SURFACE-COATING GLASS AND THE LIKE
Filed Aug. 14, 1944   3 Sheets-Sheet 1

INVENTOR.
Willard L. Morgan.
BY Corbett, Mahoney + Miller
ATTORNEYS

Aug. 28, 1945.   W. L. MORGAN   2,383,470
METHOD OF AND APPARATUS FOR CLEANING AND
SURFACE-COATING GLASS AND THE LIKE
Filed Aug. 14, 1944   3 Sheets-Sheet 2

INVENTOR.
Willard L. Morgan.
BY Corbett, Mahoney + Miller
ATTORNEYS

Aug. 28, 1945.  W. L. MORGAN  2,383,470
METHOD OF AND APPARATUS FOR CLEANING AND
SURFACE-COATING GLASS AND THE LIKE
Filed Aug. 14, 1944   3 Sheets-Sheet 3

INVENTOR.
Willard L. Morgan.

ATTORNEYS

Patented Aug. 28, 1945

2,383,470

UNITED STATES PATENT OFFICE 2,383,470

METHOD OF AND APPARATUS FOR CLEANING AND SURFACE-COATING GLASS AND THE LIKE

Willard L. Morgan, Columbus, Ohio, assignor to Libbey-Owens-Ford Glass Company, Toledo, Ohio, a corporation of Ohio Application August 14, 1944, Serial No. 549,402

10 Claims. (Cl. 117—6)

This invention relates to a method of and apparatus for cleaning and surface-coating glass and the like. More particularly, the present invention relates directly to a method of cleaning glass, porcelain, siliceous compositions, metals, or other support material to a surface or surfaces of which there is to be applied a coating, such, for example, as a low reflection coating, or a metallized or reflective layer of a suitable material for the production of various articles, such as mirrors, reflectors, and the like.

It is frequently desirable and necessary to clean glass and metallic surfaces extremely thoroughly. This is especially true when the glass, metallic, or the like support surface is to be coated subsequently with a coating or a reflective layer, by means of thermal evaporation or sputtering within a vacuum, to thereby produce mirrors, reflectors and similar optical articles or objects. It has long been recognized that if the support surface to be coated in such operations is not thoroughly clean and free of all foreign particles or contaminants, the reflective layer deposited by the coating operations will not adhere satisfactorily to the surface. Although some degree of adherence may be secured upon a surface which is only partially clean, the resulting coated surface will not be uniform, but will exhibit areas of poor adhesion which may appear as hazy areas, streaks, and uncoated pinholes. Such areas of poor adhesion, if numerous enough will interfere with the reflective value of the finished article, and in addition these may function as potential centers of corrosion.

Conventional methods of cleaning glass or metallic surfaces which are to be employed as supports for metallic reflecting layers involve, commonly, a preliminary chemical cleaning of the surface to be coated, such as by washing with a solution of a mineral acid containing sodium dichromate, or by scrubbing with a dilute solution of an alkali containing, if desired, a mild abrasive. Detergents, wetting agents, and the like, are also added to the acid or alkaline cleaning solutions to improve the action thereof. After undergoing such treatment, the article to be coated is usually rinsed thoroughly with distilled water to remove all traces of the cleaning reagent. The preliminarily cleaned surface may then be further subjected to the effects of a high voltage electrical discharge, generally in air under a vacuum of, for example, 0.01 millimeter of mercury. Such electrical discharge treatments are based on the theory that the electrical glow discharge imparts greatly increased translational velocity to the molecules of the air; that intense bombardment of the surface to be cleaned results therefrom; and that the force of this bombardment is sufficient to effect the physical removal of the contaminants, such as particles of foreign matter, adhering to the surface undergoing treatment. Despite extensive investigation of wide variations of the various operating conditions and techniques involved in such procedures, these conventional methods are not, however, satisfactory. On the contrary, they most frequently result in imperfectly cleaned surfaces which, as above stated are not satisfactory for the production of metallically coated reflecting articles of the desired or optium quality, particularly with reference to freedom from pinholes, adherence and corrosion resistance.

It is, therefore, one of the objects of the present invention to provide an improved method of cleaning glass, metallic, or other surfaces with the utmost thoroughness.

It has also been recognized that if cleaned surfaces, such as those cleaned in the conventional manner as described above, are to be coated with a metallic reflecting layer, or with other coatings, with any degree of success whatsoever, it is imperative that such coating operations be undertaken immediately after the conclusion of cleaning operations. If the operation of coating the cleaned surface is not immediately effected, the cleaning operations, such as those described, must necessarily be repeated, since foreign particles in the atmosphere, if from no other source, will at once contaminate the surface to be coated despite all precautions, however elaborate. The wasteful, time-consuming, and otherwise uneconomical consequences of repeated cleanings are readily apparent, as are the operational difficulties and scheduling problems involved in conducting the coating operations immediately after completing the cleaning operations. Even where the cleaned articles are immediately transferred to a coating chamber the momentary contact with the atmosphere is sufficient to cause contamination of the support by greases and lint and to cause considerable spoilage.

It is, therefore, another object of my invention to provide an improved method of protecting cleaned glass, metallic, or the like supporting surfaces until such time as it is desired to perform the deposition operations on such cleaned surfaces for the production of metallized articles, mirrors, and low reflection articles of a coated nature.

Heretofore, it has not been possible, with conventional preliminary chemical cleaning and washing operations or technique, to thoroughly cleanse articles or objects formed from glass, metal, or other materials except possibly those having flat, plane, or sheet-like smooth surfaces. It was impossible, with such methods, to thoroughly clean articles or objects which were multi-sided, or of irregular contour, or of uneven surface or surfaces such, for example, as tumblers, jars, vases, toys, lenses, prisms, buttons, and the like.

It is, therefore, another object of my present invention to provide an improved method of cleaning glass, metallic, or other surfaces with the utmost degree of thoroughness, whatever the dimensional, or angular, or other irregularities may be; and, when such surfaces are to be coated with a metallic reflective layer or other coating, to provide an improved method of protecting the cleaned surfaces from contamination until such time as it is desired to undertake deposition operations thereupon.

It is a further object of this invention to provide an improved method of cleaning glass, metallic, or other surfaces of whatever physical configuration, with the utmost degree of thoroughness, and to provide an improved method of protecting such cleaned surfaces from contamination until such time as it is desired to undertake metallic coating or deposition operations thereupon; it being another object of my invention to perform both of said operations or methods automatically and continuously preferably by immediately successive steps.

Other objects and advantages of my invention will be apparent from the following detailed description and examples hereinafter set forth, and from the appended claims and drawings forming a part of this specification, in which drawings like reference characters designate corresponding parts in the several views.

In said drawings:

Fig. 6 is a side elevational view, partly in section and somewhat diagrammatic, illustrating a suitable apparatus embodying the present invention, for thoroughly cleaning articles by flame contact to burn off foreign matter or particles and for subjecting the cleaned articles to a saturation treatment by vapors from some suitable organic liquid or liquids, such as glycol, or the like.

Figure 1:
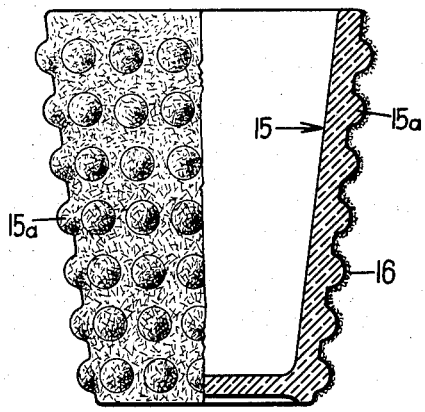
Fig. 1 is an elevational view, partly broken away of a soiled article of manufacture to be treated by the method and apparatus of the present invention.

Before explaining in detail the present invention it is to be understood that the invention is not limited in its application to the details of construction and arrangement of parts illustrated in the accompanying drawings, since the invention is capable of other embodiments and of being practised or carried out in various ways. It is to be understood also that the phraseology or terminology employed herein is for the purpose of description and not of limitation, and it is not intended to limit the invention herein claimed beyond the requirements of the prior art.

Generally speaking, my invention has to do with a method or process and a suitable apparatus for performing or carrying out the same, which is adapted particularly for the thorough cleaning of surfaces formed from support material of various kinds such, for example, as glass, and articles of manufacture and the like which may be formed from various siliceous or vitreous materials, or the like. It has to do further with the protection, during storage, of these thoroughly cleaned surfaces and prior to the application thereto of a permanent coating or surface finish which may be, for example, a high or low reflective coating or layer formed from metal, or other materials. Moreover, the method or process and the apparatus of my invention are particularly well adapted for the thorough cleaning of the surfaces of articles whether such surfaces be irregular or uneven, curved, or plane surfaces.

In accordance with my present invention, the surface to be thoroughly cleaned is, preferably, first mechanically and chemically cleaned and thereafter subjected to a thorough cleaning by treatment of the surface or surfaces directly with a flame from a gas burner, or series of burners of any desired type. The direct surface momentary contact burning serves to completely remove all foreign material and particles from the surface and to leave said surface in an absolutely clean state. In order to preserve the cleanliness of the surface, I next subject said cleaned surface to the vapors of some suitable organic liquid to produce thereupon a protective film or coating before the article is placed in storage where it may remain for an indefinite period of time without danger of contamination, to be later provided with a suitable permanent coating.

This permanent coating may be applied in various ways. For example, the article or surface to be coated may be subjected to a glow discharge in an enclosed chamber and the preliminarily or protective organic liquid film or coating removed therefrom by bombardment. Preferably, immediately thereafter and while in the same chamber, the clean surface or article may be provided with the desired coating by the thermal evaporation of some suitable material, or by other means.

If desired, the protective coating may be removed from the surface or article in any desired manner and by any suitable means, such as by the application of suitable heating or by evaporation in a high vacuum, and a final and permanent coating applied thereto while located within a chamber or compartment in which a suitable material is evaporated and applied to the thoroughly cleaned surface. By way of example, this last-mentioned coating may be produced in an electrically heated oven or furnace, or in a similarly heated tunnel within which is located a crucible, or series of crucibles containing the material, such as metal, to provide the final coating. The crucibles are heated either electrically or in any other suitable manner to a temperature which is sufficiently high to effect the evaporation of and dispelling or dispersing of molecules of the metal, or other material, which will be deposited upon the surface or article, or plurality of such, which are located within the tunnel.

In accordance with one form of my invention the steps of thoroughly cleaning the article by its subjection to direct contact with a flame or flames to completely free the article of all foreign matter and contaminants and the application of a final permanent film or layer of the desired coating material to the cleaned article, may follow in rapid succession.

I have discovered that glass, porcelain, various siliceous, metallic, or the like surfaces of the types hereinabove described, preferably preliminarily cleaned by conventional means, may be cleaned thoroughly and completely by subjection for a relatively short period of time to the relatively high temperature action of a gas flame, or the like. The fact of the absolute cleanness of such flame-treated surfaces may be established or proven in a number of conventional ways. Thus, for example, if a fine, clean fiber or whisker of glass is drawn across the surface of a piece of glass which has been cleaned by rubbing with ordinary detergents, the fiber or whisker moves freely over the surface. When, however, a fiber or whisker is drawn across a glass surface which has been cleaned according to the method and apparatus of my present invention, it will seize, and rasp. This action of the fiber is brought about by the friction between the glass surfaces. Such friction is not appreciable unless the glass surfaces are completely clean, since contaminants act more or less as lubricants. Unless the surfaces are completely clean, the effect of drawing glass over glass is reduced to that of the low frictional forces exhibited by the contaminants.

Another test for determining the complete cleanliness of surfaces cleaned in accordance with the method and apparatus of my invention, is the production on the surfaces of so-called "breath figures." For example, it is well known that moisture condenses unevenly and in droplet formation upon incompletely cleaned glass surfaces, such as those cleaned by conventional methods. On the contrary, when a glass surface which has been cleaned in the manner herein described is breathed upon, a condensation apparently black in color results upon the surface. The dark coloration is due to the extreme uniformity, continuous nature, and thinness of the moisture film condensed in this way, and is characteristic only of extremely clean surfaces.

Further, if a metallic surface is cleaned in accordance with the method and apparatus of my present invention, and then exposed to the action of a metallic vapor such, for example, as mercury vapor, no change in appearance of the surface is observed, although it is known that metallic deposition has occurred thereon. On the other hand, when metallic surfaces cleaned according to conventional practise are exposed to mercury vapors, a marked area whereon vapor condensation and mercury deposition has occurred, is at once readily observable. This phenomenon is closely related to, and in fact commonly identified as, a "breath figure" effect.

I have discovered further that glass, metallic, or the like surfaces of the types hereinabove described, when cleaned in accordance with the method of the present invention, exhibit extremely desirable properties with respect to providing an optimum surface for the subsequent deposition of metallic or other material layers by thermal evaporation or sputtering. Reflecting layers deposited on surfaces cleaned in this way demonstrate excellent uniform adherence to the support material. In addition, they are of uniform color and reflecting or other optical values and practically without uncoated pinhole areas.

I have made the further discovery that surfaces cleaned in accordance with the method of my invention may be effectively maintained in a condition of absolute cleanliness by depositing thereon a film or layer of an organic liquid which is not substantially subject to volatilization under the conditions of temperature at which the surface is to be protected from contamination during transfer to the coating operation or storage prior to such operation.

The widespread industrial functions of my invention, as well as the economic simplifications permitted thereby, are at once apparent, since it enables more effective cleaning of glass, metallic, and the like support surfaces than has heretofore been possible, and also permits the protection of such cleaned surfaces to thereby satisfy a long felt but hitherto incompletely fulfilled industrial necessity. In addition, its diversified utility is greatly enhanced since my invention is obviously equally applicable and well adapted to the thorough cleaning of plane and irregular surfaces, and to the absolute protection from contamination of any and all such cleaned surfaces.

One preferred sequence of operations or steps comprising my invention may be as follows, although I wish it to be distinctly understood that this sequence is outlined merely for purposes of illustration and that, if desired, such steps of the method in certain instances as, for example, preliminary mechanical or chemical cleaning and/or storage, may be omitted entirely:

1. Preliminary mechanical or chemical cleaning of the surface or surfaces.
2. Heat treatment.
3. Deposition of organic liquid film on the cleaned surface.
4. Storage of protected articles.
5. Removal of protective film.
6. Deposition of metallic or outer coating material layer.

Referring now to the drawings and particularly to Figs. 1 to 5, inclusive, thereof, I have shown in these figures one kind or type of article whose surface or surfaces are thoroughly cleaned and then protected against the accumulation of foreign matter, particles, or contaminants, in accordance with the method or process and apparatus embodying my invention.

Figs. 1 to 5, inclusive, are intended to illustrate an article and also the steps of preliminarily cleaning the surface thereof mechanically and chemically; thoroughly cleaning the preliminarily cleaned surface by direct contact of the surface with a hot flame or flames from a suitable burner or burners; and thereafter the application to the thoroughly cleaned surface, of a protective coating or film which may be provided by the vaporization of some suitable organic liquid and the condensation of the vapors onto the surface.

The article shown in Figs. 1 to 5, inclusive, has the general appearance of a hob-nail type of vase or jar. The article may be formed from glass, siliceous material, pottery, metal, or the like. As shown, the vase or jar is represented as a whole at 15. The outer face or surface of the walls is provided with a plurality of humps or bump-like projecting portions 15a, thus presenting an outer rough or uneven surface for the article.

In Fig. 1 the article is shown in its so-called original state with a layer or encrustation of dirt or other foreign matter or particles, indicated at 16. The article is preferably preliminarily cleaned mechanically and chemically in any conventional manner, as by scrubbing or rubbing the surface with some suitable aqueous solution to remove the major portion of the contaminating substances from said surface.

The second step of the method or process of cleaning the article comprises the subjection of the partially cleaned article, that is the outer surface thereof upon which remain particles or greasy coatings 17 of foreign matter (see Fig. 2) to momentary direct contact with hot flames from a gas burner or burners of any desired type. As seen in Fig. 3 the burner or burners are provided with nozzles 18 which emit hot flames 18a which directly contact or impinge the surface to be cleaned and completely spread over the entire area of said surface to blanket the same with flame, somewhat in the manner illustrated diagrammatically in this figure. In practise, a series or succession of the articles 15 may be passed between spaced rows of burner nozzles, the flames from which impinge all portions of the exterior surfaces of said articles. If desired, the articles may be carried upon a suitable conveyer in a path extending between the burners. Moreover, if desired, the articles may be caused to rotate during their passage on the conveyer. In any event, each article is subjected only momentarily to flame contact and while the temperature of the flame is extremely high, at least sufficiently high to burn off all foreign matter on the surfaces, the heat from the flame does not penetrate the body of the article much beyond the skin or outer layer thereof and thus the flame or flames will have no deleterious effect upon the article. Since the body of each of the articles is considerably cooler than their outer skins or surfaces, the cooling effect of the body will work outwardly toward the skin to cool the latter reasonably promptly. It is to be understood that the flames thoroughly clean not only the relatively flat or plane surfaces of the article 15, but also thoroughly clean the uneven surfaces provided by the projections or bumps 15a.

As the third step in practising my method and after all foreign matter and contaminants have been completely removed from the surface of the article, said article is passed, preferably on a suitable conveyer, into a heated chamber to which there is admitted the vapors from some suitable heated or boiling organic liquid. If desired, I may admit a non-combustible mixture of the organic liquid vapors with carbon dioxide and nitrogen to the chamber. The vapors are indicated generally at 19 in Fig. 4. As these vapors contact the relatively cooler outer surface of the article, which is cooler than the heated vapors they condense thereon and form a protective layer or film-like coating, shown at 20 in Fig. 5. It will be understood that this protective film or coating 20 prevents any possibility of the contamination of the outer surface or skin of the cleansed article. If desired, the film-protected articles may be placed in storage in readiness to have suitable permanent coating layers applied thereto at some future time.

Figures 8, 9:
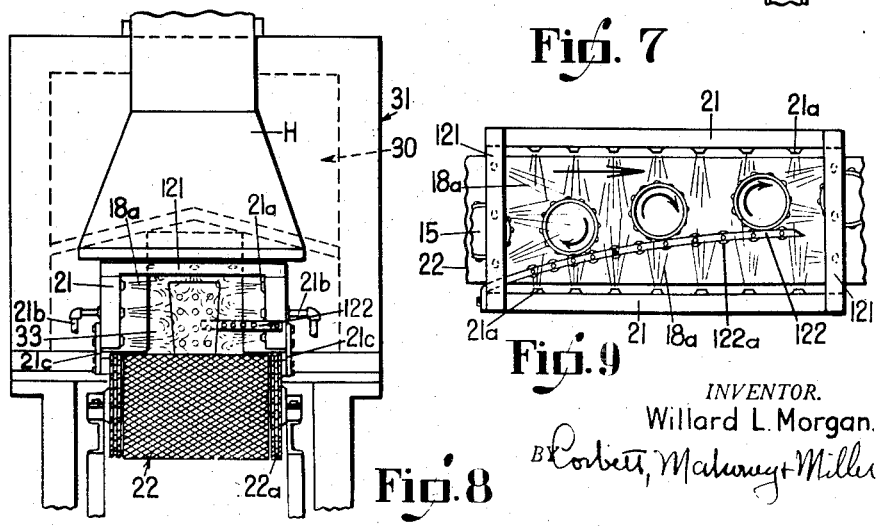
Fig. 8 is a front elevational view, on an enlarged scale, taken substantially along the line 8—8 of Fig. 6, looking in the direction of the arrows.
Fig. 9 is an enlarged detail fragmentary plan view of the burner arrangement of Figs. 6, 7 and 8 and showing suitable means for turning or revolving the articles as they are conveyed through the flame area of the apparatus.

Moreover, and as will be explained more fully below, the cleansed and surface-protected article 15 of Fig. 5 may be removed from storage and placed in a suitable vacuum chamber such, for example, as that shown in Fig. 9. While in said chamber the article 15 is first subjected to a glow discharge and bombardment to remove the protective surface coating 20 and thereafter, while remaining in the same chamber, has applied to the surface or surfaces thereof, a final or permanent coating of some suitable nature which, if desired, may be placed thereupon by deposition resulting from the thermal evaporation of some suitable material such, for example, as metal. One such suitable chamber for removing the protective coating or film 20 and for applying the final and permanent coating, is illustrated in Fig. 9, mentioned above, and which will be fully discussed hereinafter.

Figure 5:
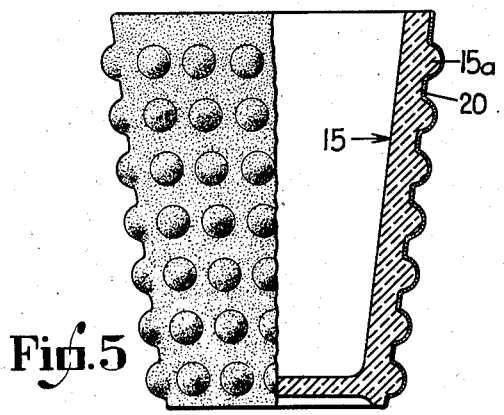
Fig. 5 is a view similar to Fig. 4 and showing the article with its protective surface coating ready to be placed in storage.
Figure 10:
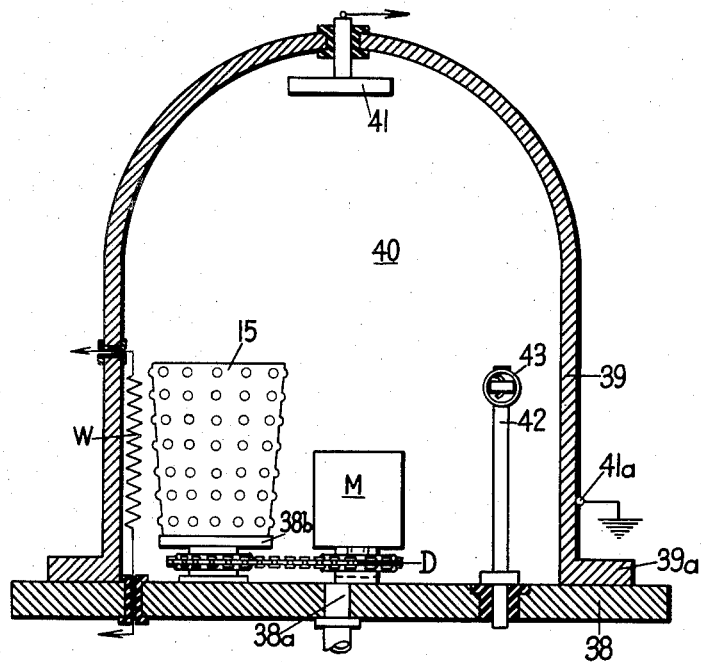
Fig. 10 is a vertical sectional view, partly in elevation, showing a suitable type of apparatus for subjecting a surface protected article to glow discharge and for applying a reflective coating to the surface of the cleaned article by thermal evaporation in a vacuum.

Application of heat to the surface-protected article 15 of Fig. 5, after placing the article in the vacuum chamber, by means of electrically heated wire or wires W may also be employed to cause a rapid vaporization in the high vacuum of the protective organic liquid film and after such removal within the apparatus of Fig. 10, a permanent deposit of metallic nature, reflective qualities, or low reflection properties of a suitable nature may be then coated upon the freshly exposed thoroughly cleaned surfaces of the article by thermal evaporation, or by sputtering of suitable materials.

Figure 5A:
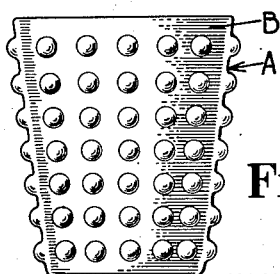
Fig. 5a is an elevational view, on a reduced scale, showing the article of the preceding views after the temporary protective film has been removed and a final or permanent reflective coating or layer has been deposited thereupon.

A finished article with its final or permanent coating is shown in Fig. 5a, the article as a whole being shown at A and its final reflective or other coating at B.

Figure 2:
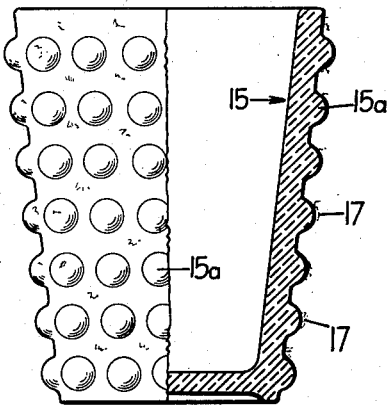
Fig. 2 is a view similar to Fig. 1 showing the article after it has been mechanically and chemically cleaned, showing some of the foreign matter or particles still remaining on the surface thereof.
Figure 3:
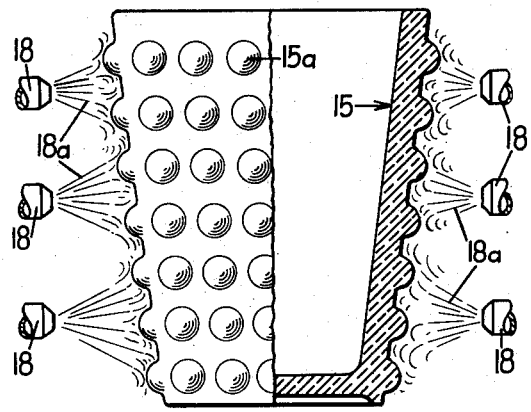
Fig. 3 is an elevational view, partly broken away, of the article of the preceding views and illustrating diagrammatically, one mode, means, or method of subjecting the surface or surfaces of the article to flame contact to remove all foreign matter or particles therefrom.

In accordance with the present invention, cleaning operations upon the glass, siliceous, or metallic surface are preliminarily conducted in a conventional manner, that is to say, by mechanical means to remove the superficial dirt 16 from the article 15 of Fig. 1 to present the article of Fig. 2 upon the surface of which small particles 17 of dirt remain after the conventional cleaning.

As hereinabove described, such mechanical cleaning may comprise simply rubbing with brushes or cloths containing soapy water; or it may involve washing with a solution of a mineral acid, such, for example, as nitric acid, or sulfuric acid containing sodium dichromate. Alternatively, it may involve scrubbing with a dilute solution of an alkali containing a mild abrasive. Preferably, although not necessarily, preliminary mechanical cleaning is effected by soaking or scrubbing the surfaces or articles in a warm detergent solution, preferably containing a wetting agent such, for example, as trisodium phosphate in amount, say, 5 per cent by weight of the solution, and also containing, as a wetting agent, a sulfonated fatty alcohol. The cleaned object is then washed thoroughly with distilled water to remove all traces of the cleaning solution, and then dried.

After preliminary mechanical cleaning by whatever conventional method may be employed, the surface to be coated is then subjected to heat treatment to effect removal of residual contaminants by distilling or burning these off the surface, such heat treatment resulting in an absolutely clean surface. As hereinabove set forth, a satisfactory treatment is secured by momentarily subjecting the surface of the article 15 which, as shown, has an irregular outer surface as represented by the bumps or bumps 15a, to a relatively high gas flame temperature, that is to say, a gas flame temperature of at least 1000° C. I have found that an effective heat treatment is obtained by exposing the surface to be cleaned, for a short interval of time, to a gas flame from one or a series of burners, as illustrated at 18 in Fig. 3. For example, the rough or irregularly surfaced article 15 may, if desired, be subjected to the flame from a standard Bunsen burner (about 1870° C.); to an oxy-hydrogen flame (about 2800° C.); to oxy-acetylene flame (about 3500° C.) or the like; or to the flame from a source of heat utilizing as a combustible constituent natural gas, illuminating gas, cracked petroleum hydrocarbons, or vaporized oil. In general I have found that any non-smoky gas flame which may be secured by using sufficient primary and secondary air for complete combustion and which flame is also free of ash may be used for effecting the desired heat-cleaning treatment of glass and other supports as hereinabove described, providing that during combustion the flame gives rise to a temperature of at least 1000° C.

As is well-known, when glass articles and other siliceous articles particularly are suddenly heated, there is considerable danger of fracture and spoilage occurring due to thermal strains set up within the material. Thus, when a glass support article is suddenly introduced into a high temperature furnace, cracking occurs after the article has been in such furnace for a relatively short time, and if the article is removed from the furnace within shorter periods of time, it is found that the surface is not completely clean. By such means of heating, the heat is applied to the glass largely as radiant energy which is absorbed, not only at the surface, but throughout the article, and the rate of such heating is relatively slow due to the inefficiency of absorption of such radiant energy, which in turn requires tremendously high radiant surrounding temperatures in the furnace if the rate of heating is to be at all fast. In contrast to this, when a gas flame is applied directly to the surface or surfaces of glass or other siliceous articles, such as articles 15, there is a tremendously high rate of heat input directly into the surface or surfaces of the glass article through convection and contact with the hot gases. Thus, the surface of the glass article may be raised to very high temperatures before much heat actually is conducted from such surface into the interior or body of the glass article. In this way, the temperature of the surface of the glass may be raised to a sufficiently high temperature to burn off and to thoroughly clean the surface without effecting thermal shock or fracture within the article or support material, and when applying the gas flame the cleaning can thus be effected within very short periods of time.

In a siimlar way, the use of a gas flame applied to the surface for cleaning has been found desirable with regards to permitting rapid application or condensation of a protective organic liquid film immediately thereafter, since the gas flame does not introduce either to glass, siliceous, or metal supports or articles within the short time of treatment of the flame, a sufficient amount of heat to raise the article or support temperature to a very great degree. Thus, by the transfer of heat from the hot surface into the interior of the article or support body, a considerable speed and degree of cooling is achieved after the flame is removed and the articles or supports quickly attain over-all temperatures below 400° to 200° C., which will permit condensation of the liquids on such surfaces. Thus, the flame can immediately be followed by the application of the organic liquid to the surface or surfaces of the article or support material, whereas a furnace-treated material would remain hot long periods and thereby increase the possibilities of contamination before the liquid protective film could be applied.

Figure 4:
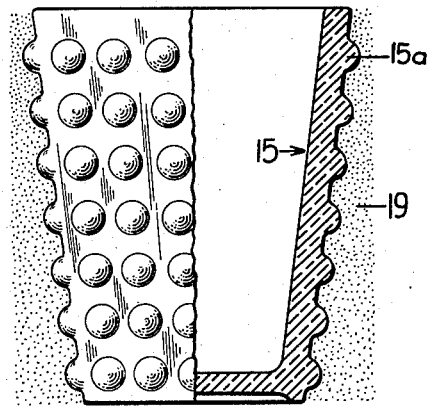
Fig. 4 is a view similar to Figs. 1 and 2 and showing the thoroughly cleansed article having its surface or surfaces saturated with a protective coating, such as glycol vapors, or the like, to prevent the lodgment of any foreign matter thereupon.

The application to the cleaned surface of the article 15, of the organic liquid in the form of vapor is illustrated generally at 19 in Fig. 4 of the accompanying drawings, the resultant coated and protected article being seen at 15 in Fig. 5 and its protective coating or covering layer or film at 20, as explained above.

In terms of continuous, automatic industrial operation, final cleaning by heat may be effected by passing the chemically cleaned articles on a conveyor, or the like transmission system before a battery of gas flames, so disposed that the areas to be cleaned and later coated are swept by the flames, and at such a rate that thorough cleaning results.

Figure 6:
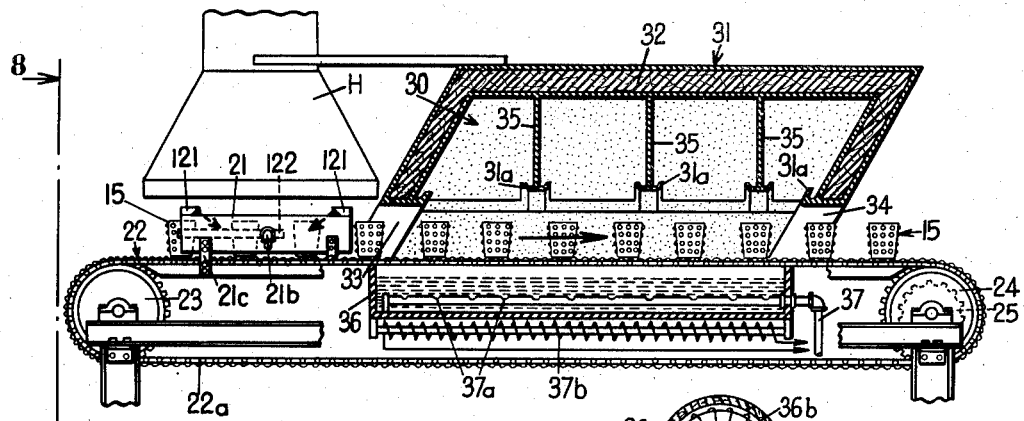
Figure 7:
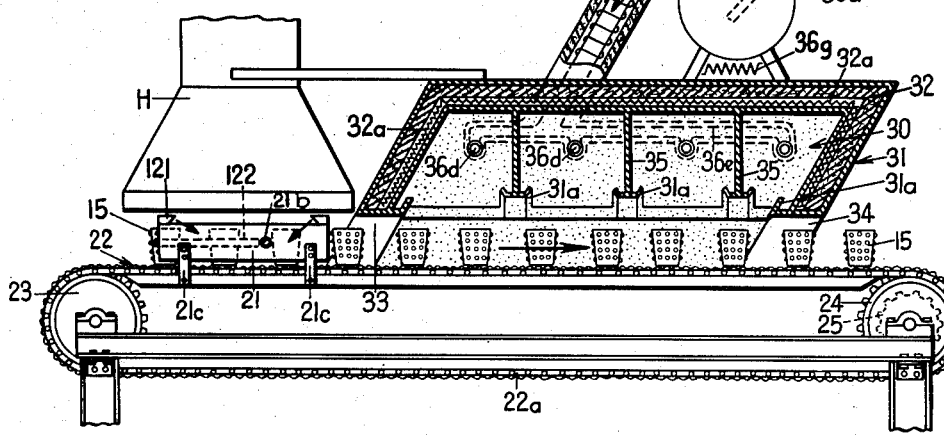
Fig. 7 is a side elevational view, partly in section and somewhat diagrammatic, of another form of apparatus embodying the invention for performing or carrying out the steps performed by the apparatus of Fig. 6.

One suitable apparatus for thoroughly cleaning the surfaces of the articles to be later coated, is shown in Figs. 6, 7, 8 and 9 of the drawings, the form shown in Fig. 7 differing from the apparatus of Figs. 6 and 8 only insofar as the provisional or temporary protective coating-applying chamber or unit is concerned.

In accordance with that portion or unit of the present form of apparatus for subjecting surfaces to be cleaned to direct contact with flames, I have shown a pair of spaced-apart oppositely disposed gas, or the like burners 21. Above the burners a hood H is supported in any suitable manner. As shown, each of these burners is supported above and adjacent one side of an endless power-driven conveyer 22. Each of the burners is supplied with air ports and has a rectangular or oblong body portion having located in its inner wall or surface, a plurality of spaced nozzles or openings 21a which emit jets of flame 18a which, as clearly seen in Fig. 8 come into surface contact with or impinge the outer surface or surfaces of the articles 15 as they are moved by the conveyer between the spaced burners 21. Fuel is supplied to the burner bodies or housings through inlet pipes or conduits 21b having control valves therein (not shown) which are connected to a suitable source of gas or other combustible mixture supply (not shown). Each of the burners 21 is, as shown, supported by several strap-like brackets 21c which are attached to and carried by longitudinal frame members of the apparatus. At opposite ends of the body portions of the burners 21 there are located additional burners or burner units 121. These, as shown, bridge the space above the articles 15 and conveyer 22 and their jets of flame are preferably directed inwardly and downwardly toward the moving articles, as indicated by the arrows in Figs. 6 and 7. The end burner sections throw out flames which, with the flames 18a, entirely blanket or envelop the surfaces of the articles 15. Thus, relatively flat articles, as well as the type shown, will be directly subjected to the hot flames from the battery of burners. As clearly seen in Figs. 8 and 9, the gas jets or flames 18a spread over the entire area of the outer surfaces of each of the articles 15 so as to burn off and thus thoroughly cleanse these surfaces.

Since it is desirable that all surfaces of the articles be directly contacted by the hot flames from the burners, I have provided suitable means to cause the turning or revolving, no matter how little, of the articles 15 as they are passed by the conveyer through the flame area. As shown, see particularly Fig. 9, such means may be in the form of a slightly curved steel or other metal arm 122 having a series of idler rollers 122a with which the articles 15 come in contact as they are passed through the flame area by the conveyer 22. Such contact causes the articles to shift or turn to present all surfaces thereof to the flames.

The conveyer 22 may be of any suitable type such, for example, as one formed from a plurality of transversely extending metal slats, rods or bars which are supported or carried at their opposite ends by suitable endless chains 22a. If desired, the conveyer belt, or the like, may be formed from heavy wire mesh having relatively large openings, or a relatively heavy and fine mesh, such as used in glass machinery, may be employed. The conveyer 22 is preferably supported at its opposite ends by sprockets 23 and 24 over which the endless chains 22a travel. As seen in Fig. 6, the conveyer may be power driven by a drive chain (not shown) which meshes with a gear or smaller sprocket 25 associated with the sprocket 24, from a suitable source of power (not shown).

Protection of a thoroughly cleaned surface from contamination is assured, I have discovered as above set forth, by immediately depositing thereon after the flaming, and after the support article has partially cooled, a film or layer of an organic liquid which is not particularly subject to volatilization at the temperature of the partially cooled surface, or at the temperature at which it is desired to protect the surface during storage prior to its being coated with metal or other material.

I have found that organic liquids of relatively high boiling point are eminently satisfactory for such purposes. Thus, organic liquids of boiling point in the general range 200° to 400° C. as, for example, -methyl anthracene, -ethyl naphthalene, -naphthol, o-phenyl phenol, biphenyl, dibutyl phthalate, diethyl phthalate, dimethyl phthalates, diethylene glycol mineral oils, are all suitable for this purpose. It is to be distinctly understood, however, that I do not limit myself to the use of pure organic liquids, or to single compounds only. As already described, the function of the liquid film is to prevent contamination of the cleaned surface. I have found that organic liquids boiling in the general range 200° to 400° C. exhibit the necessary quality of evaporating very slowly at ordinary temperatures, even when in the form of very thin liquid films. They may, therefore, serve very satisfactorily as protective films for the purposes of this invention, permitting storage of the articles so coated until it is desired to undertake deposition operations. I have further found that these organic liquids are sufficiently volatile under high vacua of the order of, for example, 0.1 mm. to 10 to the minus 5 mm. of mercury, so that they readily evaporate. Alternatively, being organic liquids, they may be readily removed from protected surfaces by electrical glow discharge and by direct oxidation of such films during such treatment. Any organic liquid, or mixture of organic liquids, serving this function, and of sufficiently high boiling point to preclude substantial volatilization and loss at the temperature at which the surface is to be protected, will, therefore, be found suitable for such application.

I have found that deposition of the protective liquid layer may be readily accomplished by exposing the surface to be coated at a temperature below the boiling point of the coating liquid, to the vapors of the liquid at or around the boiling temperature. Condensation of vapors on the surface of the article immediately occurs, with the deposition of an extremely thin liquid film, covering the article completely regardless of how irregular its surface may be. As a matter of mechanical expediency such operations may be readily effected by introducing the article to which a protective coating is to be applied into a chamber saturated with the vapor of protective liquid. Vapor may be supplied in this way, for example, by boiling a supply of the liquid within the chamber itself, or by boiling in a reservoir from which effluent vapors are conducted into the chamber. In the latter event, it may also be found desirable to preheat the gases prior to entering the chamber, and it is of course necessary to maintain temperature conditions relating to the chamber at such a level that saturation of the atmosphere therein with vapors of the coating liquid is assured.

Deposition operations may also be suitably conducted by spraying the organic liquid as a fine mist over the surfaces or articles to be protected. Such a technique provides a relatively thick protective coating of liquid and is, therefore, preferable in certain instances to deposition by condensation. Obviously, too, relative simplicity of equipment may render spraying operations more attractive, economically, for some applications than condensation. Such spray application may be conducted with a continuous belt under a hood, immediately following flaming treatment upon such belt, preferably employing compressed nitrogen or carbon dioxide as the gas fed to the spray gun to disperse and spray the organic liquid.

To definitely provide protection of a completely cleaned surface, it is desirable to subject the surface to liquid coating operations as hereinabove described as soon after conclusion of the final flame cleaning step as may be, since contamination by atmospheric vapors and lint, if from no other source, is otherwise unavoidable. In terms of automatic, continuous operation, therefore, I find it desirable, immediately after the heat treatment, to conduct the thoroughly cleaned articles into a vapor chamber, such as shown in Figs. 6 and 7. Since in flaming it is only necessary to apply the intense heat to the surfaces of the articles of glass, siliceous material, or metal, for a relatively short time, these articles cool quickly either by the heat being conducted within the mass of such support articles, or otherwise. Consequently the vapors of the high-boiling protective liquid readily condense on the articles shortly after flaming. The vapor chamber may, therefore, be of such length as to ensure that sufficient cooling of the article occurs to bring about vapor condensation upon its surface.

Referring further to Figs. 6, 7, 8 and 9 of the drawings, I shall now describe that portion or unit of the two forms of apparatus shown in these figures in which the temporary protective film or coating 20 of a suitable organic liquid is applied to the thoroughly cleaned surfaces of the articles, such as the articles 15, as they are fed by the conveyer beyond the jets of flame 18*a* which have burned off all foreign matter from the surfaces of the articles.

As shown in Fig. 6, the conveyer 22 extends through a chamber 30 within the unit for applying the temporary protective film or coating. As seen in this figure, a substantially rectangular housing 31 is provided. The housing is of double-walled construction and the space between the walls is preferably filled with some suitable insulating material, indicated at 32. The front dual walls of the housing have a substantially arch-shaped opening 33 and a similarly shaped opening 34 is provided in the rear end dual walls of the structure. Depending from the top or ceiling of the housing is a series of baffle walls or partitions 35 which, as shown, terminate at their lower ends a substantial distance above the articles 15 and preferably only slightly above the arched openings 33 and 34.

Below the upper flight of the conveyer 22 there is positioned a pan or tank 36 which is open at its top and which is adapted to contain the organic liquid to be boiled off in the form of vapors to fill the chamber or compartment 30. A pipe or conduit 37 extends into the pan 36 and is perforated at spaced points, at 37*a*, to admit into the pan either carbon dioxide or nitrogen, or other non-combustible gas, for example, which is bubbled through the organic liquid. The organic liquid within the pan is caused to boil and give off vapors into the chamber 30 by the provision of an electrical heating element or coil 37*b* located immediately below the bottom of the pan or tank 36. Thus, by heating the organic liquid and by bubbling an inert gas through the same, supplied to the pan by the pipe 37, such liquid is caused to vaporize, with the vapors rising through the openings in the conveyer 22 and completely filling the compartment or chamber 30 to provide therewithin a mist-like atmosphere of vaporized organic liquid. As the vapors come into contact with the relatively cooler surfaces of the articles, they condense and form on said surfaces a continuous film or coating 20 (Fig. 5) of the organic liquid for protecting the previously cleaned surfaces of the articles. As the coated articles 15 emerge from the compartment 30 through the discharge opening 34, they may be removed therefrom and placed in storage.

In Fig. 7 of the drawings I have shown a somewhat modified vaporizing unit. As in the form of Fig. 6, a chamber 30 is provided within a housing or casing of double-walled construction shown as a whole at 31. Openings 33 and 34 are provided at the front and rear end walls, respectively. Suitable insulation 32 is provided in the space between the double walls of the housing and suitable electrical resistance or coils 32*a* are also located within the space between the walls of the housing to permit heating these to prevent condensation. Suitable baffle walls 35 are also provided in the compartment or chamber of Fig. 7 in substantially the same manner as in Fig. 6.

In lieu of the vaporizing pan or tank 36 and the heating element 37*b* of the preceding form shown in Fig. 6, in the present form of my invention the organic liquid is preferably heated and vaporized outside the unit or apparatus and supplied to the chamber or compartment 30 in the form of vapor. For this purpose there is provided a vaporizing pot or boiler 36*a* connected by a tube or pipe 36*b* to a manifold 36*c* opening at spaced intervals 36*d* into the chamber or compartment 30 through a wall thereof. The pipe 36*b* is preferably maintained in a heated condition by an electric resistance coil 36*e* which surrounds the pipe, the pipe being further maintained in heated condition to maintain the vaporized condition of the organic liquid, by means of an insulating housing or casing 36*f*. The pot 36*a* and the organic liquid therein are heated to boil the liquid by an electrical heating element or unit 36*g* which, as shown, preferably surrounds the base portion of the pot 36*a*.

A non-combustible gas is bubbled through the heated organic liquid by supplying same through pipe 37 having openings or perforations below the liquid level. By thus feeding an inert non-combustible gas through the boiling organic liquid in the apparatus as shown in Figs. 6 and 7, a continuous slight positive displacement of gas from the coating chamber 30 is provided and a non-combustible mixture of vaporized organic liquid and inert gas is maintained in the chambers, thus avoiding any accidental igniting of such vapors by the adjacently located gas flames.

When the liquid within the pot 36*a* is heated and vaporized, the vapors therefrom pass through the insulated and additionally heated tube or pipe 36*b*, manifold 36*c* and openings or ports 36*d*, into the chamber or compartment 30 so as to provide within said chamber a mist-like condition of the vapors. As the vapors strike the relatively cooler surfaces of the articles 15 passing through the chamber, they are condensed and thus provide a protective film or coating of organic liquid upon the thoroughly cleaned surfaces of the articles. As the protected thoroughly cleaned articles 15 issue through the discharge opening 34, they may be removed to storage.

In both of the forms of Figs. 6 and 7 it will be noted that the front and rear walls of the housing 31 and the baffles 35 are provided with drain troughs 31*a* which serve to collect any of the surplus condensed vapors and direct them outside the chamber or compartment for re-use.

Upon removal from the chamber, the articles may be stored for as long a period as desired, without any danger of surface contamination. Alternatively, it may be desired to coat the protected surfaces immediately with a metallic reflective coating, or a low-reflective or other type of coating.

In any case, when it is desired to undertake such coating or deposition operations, the protective organic liquid film may be readily removed to expose a thoroughly clean surface upon which metallic or other coating depositions may be successfully effected by known thermal evaporation or sputtering means. Thus the protective layer, along with foreign matter which may have settled upon its surface, may be removed by subjecting the surface to heat, or preferably, to a vacuum and to an electrical glow discharge, in a vacuum of, say, about 0.01 millimeter. The advantages of effecting coating removal by evaporation of the organic liquid within a vacuum, with or without applying heat, or by electrical glow discharge methods are apparent. Thus, for example, both removal of the high-boiling liquid and deposition operations of metals or other materials may be conducted consecutively in the same vacuum chamber, thereby precluding the possibility of contaminating the cleaned surface prior to deposition.

Referring now particularly to Fig. 10 of the drawings, I have shown therein a suitable apparatus providing a chamber within which the temporary or provisional surface protective coating may be removed from an article and to the surface or surfaces of said thoroughly cleaned article, a final and permanent coating, such as a reflective coating, may be applied by deposition resulting from thermal evaporation.

In Fig. 10 I have shown one form of apparatus which is adequately suited to the purpose of performing the operations just referred to. As shown, the apparatus comprises a supporting base 38 upon which is mounted a suitable housing 39 provided with a semi-spherical or dome-like top and with a surrounding base flange or projection 39a which has a tight sealing fit with the top surface of the base 38 to provide a sealed chamber or compartment 40 within the housing walls.

The chamber 40 is adapted to be completely evacuated of air and have a high vacuum created therein. For this purpose, evacuating means is provided, such means being in the form of suitable pumps (not shown) for evacuating or withdrawing the air from within the chamber through an outlet pipe 38a which latter is in communication with the chamber 40 through the base 38.

When it is desired to provide upon the thoroughly cleaned and surface-protected article 15, a final and permanent coating, such as a mirrored or reflective surface coating, the article with its protective coating layer or film 20 is placed upon a suitable support 38b which, if desired, may be caused to revolve or rotate in any suitable manner, as by means of an open-type greaseless electric motor M drivingly connected at D to the support 38b, said support being suitably mounted upon the base 38. While I have shown a single article 15 located within the chamber 40, it will be understood that my invention contemplates placing within the chamber a plurality of articles which may be supported upon individual supports or platforms which may or may not be caused to revolve. Moreover, a common supporting base or platform may be employed for all of the articles; or they may be placed directly upon the supporting base 38 of the apparatus.

After the article or articles 15 have been so positioned, the housing 39 is placed in position upon the base and the chamber 40 is then evacuated as desired by operating the pumps previously referred to. After a vacuum has been created, the temporary protective film or layer 20 formed from some suitable organic liquid, starts to evaporate within the vacuum and is further removed by subjection to an electric glow discharge and bombardment from an electrode 41 by energizing said electrode to provide an electric glow discharge within the vacuumized chamber. In the form of apparatus shown, I use the wall of the chamber, if formed from metal, as one electrode, as shown at 41a. This operation removes the temporary protective film 20 from the article or articles and also removes any foreign matter on said film by bombardment, by the boiling during evaporation of the organic protective film and by oxidation. I preferably apply to the electrodes 41 and 41a a high tension electrical current of 5,000 to 30,000 volts and about 3 k. v. a. of current.

Alternatively the protective organic liquid film may be removed by heating the article or articles 15 after positioning within the vacuum chamber 40, by energizing the heater wire or wires W and by evacuating the chamber. This causes a rapid ebullition of the liquid film which carries off with it any contaminations which may have fallen upon the protective coating while the article was held in storage. The article may then be further glow discharged, if desired.

After the temporary protective coating or layer 20 has been completely removed and suitable vacuum conditions have been established, the filament 43 of an evaporating unit 42 and to which suitable material to be evaporated has been applied in any suitable manner, is electrically energized to effect the thermal evaporation of said material and apply it to the freshly exposed clean surface or surfaces of the article or articles 15 by deposition resulting from the thermal evaporation of the material on the filament 43. Because of the fact that the surface which has just been coated by deposition was thoroughly cleaned, protectively maintained in such condition, and only exposed in such cleaned condition within the vacuum chamber, before the deposition of the material, the final coating, layer or film will be of a permanent nature and adhere firmly to the surface of the article without the danger of becoming loose and rubbed off or removed therefrom during use.

While I have described and illustrated the use of my method or process and apparatus for carrying it out in connection with articles such as vases or the like, various other articles formed from various materials and of varied sizes and shapes which are eventually to be provided with a final metallized or other protective coating, can be treated in accordance with my present invention. For example, if it is desired to coat iron bolts, or the like, with a coating of cadmium, for example, the ordinary bolts taken from stock with dirty surfaces, may be vapor degreased and then placed on the conveyer 22 and subjected to the flame treatment in much the same manner as are the articles 15 disclosed in Figs. 3, 6, 7, 8 and 9 of the drawings. After the flame treatment of the bolts, they are passed through the vaporizing chamber 30 of the apparatus of either Fig. 6 or 7 and removed therefrom with their protective surface coating to storage. If desired, however, they may be carried directly from the preliminary protective coating chamber 30 into a furnace, such as the electric furnace shown as a whole at 50 in Fig. 11. The furnace 50, as shown, is provided with a double-walled casing having insulation 52 between the walls and an electric heating element 53 which is also located between the walls.

Upon the furnace base or floor 54 there is preferably located an open top pot or crucible 51 which contains the metal or other material to be heated and vaporized in any suitable manner, as by means of an electrical heating element 55 located below the crucible. The bolts B may be carried into the furnace on a suitable conveyer 56 which serves to move the bolts through the furnace. As the material such, for example, as cadmium within the crucible 51 is boiled, the vapors therefrom completely fill the furnace with a mist-like atmosphere of the evaporated cadmium. An inert non-combustible gas, such as nitrogen or carbon dioxide, may be introduced into the furnace so as to maintain the furnace under a slight positive pressure.

Because of the high heat within the furnace the organic liquid protective film or coating on the bolts is immediately evaporated so as to ensure the removal therefrom, not only of the protective coating but also of any foreign contaminants. Since the atmosphere within the furnace 50 is saturated with cadmium vapors, the bolts rapidly become covered with the desired finish layer or coating of cadmium. After removing from the furnace the bolts have a uniform, adherent cadmium coating and excellent corrosion-resistance properties.

Figure 11:
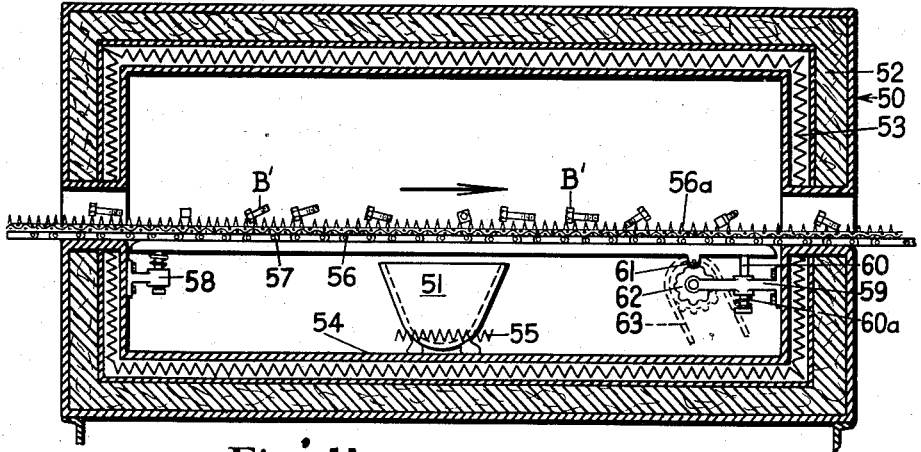
Fig. 11 is a longitudinal vertical sectional view, partly in elevation, of another form of apparatus embodying the present invention for applying a suitable final or permanent coating or film to thoroughly cleaned articles such, for example, as bolts.

While I have described one type of furnace, such as that shown at 50 in Fig. 11, it will be understood that the surface-protected bolts may have a final coating applied thereto in any other suitable type of furnace, or by any other suitable means. Moreover, any desired type of conveyer may be employed for moving the bolts through the furnace. The conveyer 56 is preferably provided with a plurality of pointed humps or bumps 56a so that the bolts B will not lie flat on the conveyer. The upper flight of the conveyer is preferably supported by longitudinal bars or rails, one such being shown at 57. As shown, the rail 57 is spring-supported at its front end by a bracket, rod and spring assembly, shown as a whole at 58.

It might be desirable to vibrate the conveyer. For this purpose, as shown, the bar 57 is supported at its rear end by a bracket or arm 59 carrying a spring-cushioned rod or pin 60 attached to the bar. The under face of the bar, adjacent pin 60, is provided with an idler roller 61 which is in engagement with a rotatable notched roller or wheel 62 carried by the inner end portion of the bracket or arm 59. A drive or sprocket chain 63 serves to rotate the roller or wheel 62 at high speed. The chain is driven from any suitable source of power (not shown). Thus, the bar 57 and also the conveyer 56 will be caused to bounce or jiggle up and down against the action of spring 60a to cause agitation or movement of the bolts B so that all surfaces thereof will be exposed to the vapors rising from the crucible or pot 51. If an immovable support, platform, or tray is employed for the bolts undergoing treatment, such may be vibrated in suitable manner to ensure the even and complete distribution of the cadmium or other final or finish coating.

The following examples will illustrate certain applications of my invention. It is to be understood, however, that I intend these as illustrative only, and not limiting. They should be interpreted, therefore, in an illustrative rather than in a limiting sense.

*Example 1*

A common glass tumbler, vase, or the like, such as that shown at 15 in Fig. 1 and a section of sheet glass (not shown) were separately subjected to a preliminary mechanical cleaning to remove superficial contaminants. The articles were washed with a chemical cleaning solution consisting of trisodium phosphate, precipitated chalk, and, as a wetting agent, a sulfonated fatty alcohol. After reasonably thorough washing, the cleaned articles were rinsed thoroughly with distilled water to remove all traces of the cleaning solution. One such article is shown at 15 in Fig. 2, the remaining particles of dirt being seen at 17.

The preliminarily or partially cleaned surfaces of the articles, such as the article 15 upon which a metallic film was subsequently to be deposited, were then completely cleaned from contaminants by passing the articles before a battery of Bunsen burners fed with illuminating gas, so disposed that all those surfaces were momentarily but completely swept by the flames for a period of about 60 seconds or less. See, for example, the burners 21 and 121 of Figs. 6, 7, 8 and 9.

Immediately after this heat treatment the articles were passed into a chamber, such as the chamber 30 of Figs. 6, 7 and 8 and therein saturated with vapors (see vapors illustrated at 19 in Fig. 4) of diethylene glycol. Although the heat-treated surfaces had been subjected to a flame temperature of approximately 1870° C., and although only as short a period of time as possible had elapsed since the heat treatment, the surfaces had nevertheless cooled sufficiently so that their temperature was well below the temperature of the diethylene glycol vapors (approximately 245° C.) and condensation of diethylene glycol on the surfaces of the articles at once occurred, resulting in a film (see film or coating 20, Fig. 5) of the compound completely covering the articles. The protected articles, such as shown in Fig. 5, were then stored.

After several days had elapsed, it being desired to undertake suitable metallic deposition operations, the articles were removed from storage and placed in a conventional vacuumized chamber where such operations were to be conducted, one such chamber being shown at 40 in Fig. 10 of the accompanying drawings. The pressure in the chamber was reduced to approximately 0.08 mm. of mercury. The protective film 20 of diethylene glycol began immediately to evaporate rapidly. Evaporation was sufficiently rapid, in fact, to ensure physical removal by blowing off of any foreign contaminants which might have become lodged on the protective film 20. By reducing the pressure within chamber 40 to about 0.02 to 0.01 mm. of mercury, and by electrically actuating with a high voltage such as 15,000 volts, the electrode or electrodes with which the vacuumized chamber was equipped, see, for example, electrode 41 in Fig. 10, a glow discharge resulted which, by oxidation and by bombardment, effected complete removal of the protective films.

It is to be understood that the combination of vacuum and electric glow discharge was not necessary to effect complete removal of the protective films, since either of these measures, separately, would have ensured such complete removal.

In some trials upon samples removed from the vacuumized chamber at this point, the cleaned surfaces were demonstrated to have been completely freed from contaminants by exhibiting black-colored breath figures and by causing fine, clean glass fibers to seize and rasp when drawn across the cleaned surfaces, both of which tests, as hereinabove set forth are satisfied only by glass surfaces of absolute cleanliness and freedom from contaminants.

The exposed, completely uncontaminated surfaces were then subjected, without removal from the vacuumized chamber 40, to deposition operations, performed by the thermal evaporating unit 42, Fig. 10, whereby thin layers of aluminum from a filament 43 of the unit were deposited on the surfaces of the article 15 which it was desired to coat by thermal evaporation methods.

Upon completion of coating operations, the most careful and minute examination of the finished mirrored articles showed these to be practically free of uncoated or pinhole areas or any non-uniformities on the coated surfaces. Further, the aluminum layer was extremely adherent to the cleaned surfaces.

*Example 2*

A glass lens and a prism which it was desired to coat with low reflection films of magnesium fluoride, were preliminarily mechanically cleaned by a thorough scrubbing with a brush having an application of a chemical cleaning solution consisting of trisodium phosphate, calcium carbonate, and a sulfonated fatty alcohol as melting agent. After washing operations were completed, the articles were rinsed with distilled water to remove all traces of the cleaning solution. The articles were then conveyed past a battery of oxy-acetylene flames so disposed that the surfaces of the articles were momentarily but completely swept by the flames therefrom, see, for example, the burners 21 and 121 of Figs. 6, 7, 8 and 9. Immediately after this heat treatment, the prism and the lens were introduced into a chamber, such as chamber 30 of Figs. 6, 7 and 8, and saturated therein with vapors of dibutyl phthalate. Again, as in Example 1, although the surfaces of the articles had been exposed to a high temperature, in this case approximately 3500° C., the extremely short interval of time between this heat treatment from burners 21 and the introduction of the articles into the condensation chamber 30, had nevertheless been ample to permit cooling of the flamed surfaces to a temperature below that of the dibutyl phthalate vapors—approximately 340° C. As in Example 1, condensation of organic liquid vapors completely covering the cleaned articles at once occurred.

The thus protected articles were then stored for several days, until it was desired to undertake coating deposition operations. At that time the articles were remved from storage and placed in the conventional vacuum chamber 40 designed for such operations. The protective dibutyl phthalate films, together with foreign contaminants which might have lodged thereon during storage of the articles, were then removed, as described in Example 1, within the vacuum chamber 40 by evaporation and electrical glow discharge, as from electrode 41, Fig. 9. If the glass support is to be heated during deposition of the low reflective film or coating, the heating of the glass within the vacuum prior to deposition of the magnesium fluoride or other material, may suffice to remove completely the organic liquid film, such as the film 20 of Fig. 5.

Immediately upon conclusion of the operations of removing the protective film and while remaining in chamber 40, the surfaces of the articles were coated with a thin film of magnesium fluoride by conventional thermal evaporation means employed in depositing such low-reflection coatings, such as by means of the thermal evaporating unit 42, Fig. 10. The low reflection films were without flaw or blemish spots, exhibited good adherence to the surfaces on which they were deposited, and, in intensive service tests, proved entirely satisfactory, demonstrating excellent performance characteristics.

*Example 3*

Figure 12:
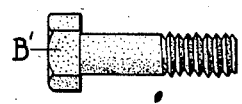
Fig. 12 is a perspective view of one of the articles treated in the apparatus of Fig. 11.

A number of steel bolts, such, for example, as those seen in Figs. 11 and 12, on which it was intended to deposit a thin layer of cadmium, were subjected to a preliminary mechanical cleaning by tumbling in a mixture of sawdust and whiting. Alternatively, they may be cleaned in a well known manner in a solvent-vapor degreaser. After cleaning the bolts reasonably thoroughly in this manner, they were removed from the tumbling barrel (not shown) and adherent cleaning mixture removed by blowing with clean, dry compressed air. The bolts were then completely cleaned of contaminants by conveying them past a battery of natural gas burners (not shown) so disposed that all surfaces of the bolts were momentarily but completely swept by the flames from the burners.

Immediately after passing the flames, the bolts were sprayed (employing compressed nitrogent in the spray gun) with mineral oil with such thoroughness that the entire surface of each bolt was subjected to the fine, mist-like spray. The mineral oil, upon contact with the bolts, covered all surfaces completely with a protective liquid layer or film. The protected bolts were then stored until it was desired to undertake metallic deposition operations. After a period of ten days the bolts were removed from storage and introduced into a furnace, such as the furnace 50 of Fig. 11, at atmospheric pressure, the temperature of which was in excess of about 770° C. The furnace 50 was equipped with a vessel or crucible 51 containing boiling cadmium, in consequence of which the atmosphere of the furnace was saturated with cadmium vapors. The vessel 51 was heated in any convenient and suitable manner, as by electrical resistance 52, located below the pot or vessel. The protective mineral oil coating on the bolts evaporated immediately from the bolts with such rapidity as to ensure physical removal of any foreign contaminants which might have become lodged thereon. The thoroughly cleaned bolts became covered with the desired layer of cadmium.

After removal from the furnace 50 the finished bolts exhibited a uniform, adherent cadmium coating and good corrosion resistance properties.

Figure 13:
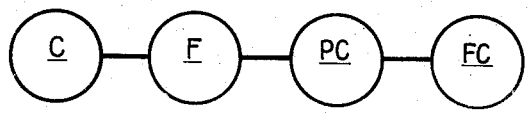
Fig. 13 is a schematic view illustrating the different parts or units of the apparatus of my invention and which may be employed for carrying out the several steps of the method or process of said invention.

In Fig. 13 of the drawings I have illustrated, schematically, the arrangement or order of the various parts or units which together constitute the apparatus of the present invention and which units or elements of the whole may be employed for performing or carrying out the several steps of my method or process. In this figure, the circle C represents conventional apparatus or equipment for mechanically or chemically preliminarily cleaning the surfaces of articles, such as the articles 15 of the preceding views. The circle designated F represents the flame treating unit or equipment for flame-treating the preliminarily cleaned articles 15.

The circle designated PC is intended to represent that portion or unit of the apparatus where the temporary protective coating of an organic liquid is applied to the thoroughly cleansed surfaces of the articles 15; and the circle designated FC is intended to represent that portion or unit of the apparatus by the use of which the temporary protective coating is removed from the articles and the final or permanent coating, which may be of a reflective nature, is deposited upon the thoroughly cleaned surfaces of the articles.

As set forth fully above the articles are first preliminarily cleaned mechanically or chemically in the unit or at the station C. They are next completely freed of all contaminants by the flame treatment at unit or station F. The thoroughly cleansed surfaces are then provided with a temporary protective organic liquid coating at unit or station PC. If desired, the temporarily surface-protected articles may be placed in storage or, if desired, they may be immediately placed in the unit or at the station FC where the temporary protective coating and any accumulation of contaminants thereon are removed to reveal the thoroughly cleansed surfaces of the articles, whereupon and in the same unit or at the same station, FC, the final and permanent coating is deposited upon the cleaned surfaces.

Widely diverse embodiments of my invention may obviously be made without departing from the spirit and scope thereof.

Having thus described my invention, what I claim is:

1. The method of coating a surface of a non-combustible support material by thermal evaporation within a vacuum chamber, comprising the steps of subjecting the support material to a preliminary mechanical cleaning, momentarily subjecting the support material surface directly to a gas flame of a temperature of over 1000° C. to remove contaminants therefrom, immediately thereafter applying to the surface by condensation of a vaporized liquid a removable liquid protective film covering of a high boiling inert organic liquid having a boiling range of the order of 200° to 400° C. to the cleaned support surface, placing the thus protected support material in a highly vacuumized chamber, removing said liquid protective film by a forced evaporation within the chamber, and thereafter applying a coating by thermal evaporation to the freshly exposed cleaned surface while remaining in said vacuum chamber.

2. A method according to claim 1, wherein the coating is a mirror reflective coating.

3. A method according to claim 1, wherein the support material is glass.

4. A method according to claim 1, wherein the support material is glass and wherein the coating is a low reflection coating applied by thermal evaporation.

5. A method according to claim 1, wherein the organic liquid is diethylene glycol.

6. Apparatus for cleaning glass and for temporarily protecting the cleaned surfaces thereof against further contamination, comprising means for subjecting the surfaces of the glass to contact briefly with a hot flame from a burner to remove contaminants therefrom, and means for applying by condensation of vapors a removable protective liquid surface coating to the glass to prevent contamination of the clean surfaces thereof.

7. Apparatus for cleaning support material and for protecting the cleaned surfaces thereof against further contamination, comprising means for subjecting the surfaces of the support material to contact briefly with a hot flame from a burner to completely remove any contaminants therefrom, adjacent means for applying a protective liquid surface coating to the support material by condensation of the vaporized liquid, said adjacent means comprising a chamber saturated with the vaporized liquid, and means for supplying the vapors of the liquid.

8. Apparatus for cleaning support material and for protecting the cleaned surfaces thereof against further contamination, comprising means for subjecting the surfaces of the support material to contact briefly with a hot flame from a burner to completely remove any contaminants therefrom, adjacent means for applying a protective liquid surface coating to the support material by condensation of the vaporized liquid, said adjacent means comprising a chamber saturated with the vaporized liquid, means for supplying the vapors of the liquid, and means for progressing the support material past the burner and through said vapor-filled chamber.

9. Apparatus for cleaning support material and for protecting the cleaned surfaces thereof against further contamination, comprising means for subjecting the surfaces of the support material to contact briefly with a hot flame from a burner to completely remove any contaminants therefrom, adjacent means for applying a protective liquid surface coating to the support material by condensation of the vaporized liquid, said adjacent means comprising a chamber saturated with the vaporized liquid, means for generating the vapors of the liquid, means for supplying a non-combustible gas to admix with said vapors within the generating means, and means for conducting the mixture of non-combustible gas and vapors of the liquid from the generating means to said chamber.

10. Apparatus for cleaning support material and for protecting the cleaned surfaces thereof against further contamination, comprising means for subjecting the surfaces of the support material to contact briefly with a hot flame from a burner to completely remove any contaminants therefrom, adjacent means for applying a protective liquid surface coating to the support material by condensation of a vaporized liquid, said adjacent means comprising a chamber saturated with the vaporized liquid, means for generating the vapors of the liquid, means for supplying a non-combustible gas to admix with said vapors within the generating means, means for conducting a mixture of the non-combustible gas and the vapors of the liquid from the generating means to the chamber, and means for progressing the support material past the burner and through said vapor and gas-mixture-filled chamber.

WILLARD L. MORGAN.